(12) United States Patent
Gaudenz

(10) Patent No.: US 11,894,675 B2
(45) Date of Patent: Feb. 6, 2024

(54) DC VOLTAGE GRID WITH VARIABLE VOLTAGE

(71) Applicant: Siemens Aktiengesellschaft, Munich (DE)

(72) Inventor: Markus Matthias Gaudenz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/430,266

(22) PCT Filed: Feb. 6, 2020

(86) PCT No.: PCT/EP2020/052967
§ 371 (c)(1),
(2) Date: Aug. 11, 2021

(87) PCT Pub. No.: WO2020/165014
PCT Pub. Date: Aug. 20, 2020

(65) Prior Publication Data
US 2022/0045508 A1     Feb. 10, 2022

(30) Foreign Application Priority Data

Feb. 15, 2019 (EP) ..................... 19157506

(51) Int. Cl.
*H02J 1/10* (2006.01)
*H02J 1/06* (2006.01)
*H04B 3/54* (2006.01)

(52) U.S. Cl.
CPC ................ *H02J 1/106* (2020.01); *H02J 1/06* (2013.01); *H02J 1/102* (2013.01); *H04B 3/548* (2013.01); *H04B 2203/547* (2013.01)

(58) Field of Classification Search
CPC ... H02J 1/106; H02J 1/06; H02J 1/102; H04B 3/548; H04B 2203/547
(Continued)

(56) References Cited

U.S. PATENT DOCUMENTS 8,824,533 B2    9/2014  Chmiel et al.
11,031,785 B1*  6/2021  Erokhovets ............. H02J 3/381
(Continued)

FOREIGN PATENT DOCUMENTS

CN    101159425 A    4/2008
CN    101758924 A    6/2010
(Continued)

OTHER PUBLICATIONS

PCT International Search Report and Written Opinion of International Searching Authority dated Apr. 5, 2020 corresponding to PCT International Application No. PCT/EP2020/052967 filed Jun. 2, 2020.

*Primary Examiner* — Daniel Kessie
*Assistant Examiner* — Dru M Parries
(74) *Attorney, Agent, or Firm* — Henry M. Feiereisen LLC

(57) ABSTRACT

A DC voltage grid includes an electrical conductor electrically interconnecting electrical components, with a DC voltage applied between parts of the electrical conductor. An actuator is configured to vary the DC voltage such that a value of the DC voltage depends on at least one state of the DC voltage grid. Information about the at least one state is transmitted to the electrical components of the DC voltage grid by way of the DC voltage. A wind farm having wind turbines connected to such a DC voltage grid and a method for operating such a DC voltage grid or such a wind farm are (Continued)

also disclosed. The DC voltage of the DC voltage grid is controlled or regulated depending on a state of the DC voltage grid.

16 Claims, 2 Drawing Sheets

(58) Field of Classification Search
USPC .......................................................... 307/125
See application file for complete search history.

(56) References Cited

U.S. PATENT DOCUMENTS

| | | |
|---|---|---|
| 2008/0246338 A1 | 10/2008 | Donnelly et al. |
| 2010/0156173 A1 | 6/2010 | Nierlich et al. |
| 2016/0018837 A1 | 1/2016 | Kaufman et al. |
| 2016/0336746 A1 | 11/2016 | Cheng |
| 2017/0180006 A1 | 6/2017 | de Hoog et al. |
| 2018/0112647 A1 | 4/2018 | Abeyasekera et al. |
| 2019/0326773 A1* | 10/2019 | Dharmadhikari ......... H02J 7/24 |
| 2021/0265835 A1 | 8/2021 | Xie et al. |
| 2022/0045506 A1 | 2/2022 | Wang et al. |

FOREIGN PATENT DOCUMENTS

| | | |
|---|---|---|
| CN | 103944157 A | 7/2014 |
| CN | 104253429 A | 12/2014 |
| CN | 108879623 A | 11/2018 |
| EP | 3 314 715 A1 | 5/2018 |
| JP | 2003339118 A | 11/2003 |
| WO | WO 2015176786 A1 | 11/2015 |

* cited by examiner

DC VOLTAGE GRID WITH VARIABLE VOLTAGE

CROSS-REFERENCES TO RELATED APPLICATIONS

This application is the U.S. National Stage of international Application No. PCT/EP20201052967, filed Feb. 6, 2020, which designated the United States and has been published as International Publication No. WO 2020/165014 A1 and which claims the priority of European Patent Application, Serial No. 19157506.7, filed Feb. 15, 2019, pursuant to 35 U.S.C, 119(a)-(d).

BACKGROUND OF THE INVENTION

The invention relates to a DC voltage grid, wherein the DC voltage grid is able to be operated with a DC voltage. The invention further relates to a wind farm and a method for operating such a DC voltage grid or wind farm.

In a power distribution grid, electrical energy is made available to electrical consumers. Here, a voltage is present on the supply lines, also referred to generally as conductors, of the power distribution grid. When a consumer is connected, it can draw a current from the supply lines. Here, electrical energy is distributed within the power distribution grid. The voltage can be an AC voltage of an AC voltage grid or the DC voltage of a DC voltage grid, also referred to as DC grid.

These days, power distribution grids are embodied as AC voltage grids. These offer the possibility to generate different voltage levels in a simple manner by means of transformers. In a DC grid, for the sake of simplicity, the DC voltage is maintained at a constant value and made available to the consumers. For this purpose, the maximum permissible nominal value is usually used. This enables the electrical consumers to be supplied with a low current at a constant power. Here, electrical losses are low on account of the low current.

The object underlying the invention is to improve a DC voltage grid.

SUMMARY OF THE INVENTION

This object is achieved by a DC voltage grid as set forth hereinafter. This object is further achieved by a wind farm having as set forth hereinafter, and by a method for operating such a DC voltage grid or wind farm as set forth hereinafter.

Further advantageous embodiments of the invention are specified in the dependent claims.

The invention is based on the knowledge that the DC voltage grid can be improved by the voltage of the DC voltage grid being variable and reflecting the state of the DC voltage grid. The invention relates to the embodiment of the voltage regulation in the DC voltage grid. The aim is to describe a state or several states of the DC voltage grid on the basis of the DC voltage of the grid. In this way, each consumer, each source and each storage unit is informed directly of the state of the DC voltage grid and can react thereto in an appropriate and for example stabilizing manner.

In the DC voltage grid, the electrical components connected thereto are connected by means of a conductor. The conductor can be for example a cable or power rails. In a DC voltage grid, the conductor here has at least two parts between which the DC voltage of the DC voltage grid is present.

The state of the DC voltage grid can be described in a simple manner by way of the amount of the DC voltage. If for example there is an over-supply of generated energy or if the energy storage units which are connected to the DC voltage grid have a high state of charge (SoC), then the line voltage increases. This takes place by the actuator increasing the DC voltage in the DC voltage grid. As a result, the state is expressed for example that the grid has a good capacity to provide energy and power. A low DC voltage, on the other hand, is intended to express that the capacity to provide electrical energy is limited. The electrical consumers can react appropriately to these states by adapting their operating behavior.

A high DC voltage shows the energy sources that they can reduce their generated power or shows the energy storage units that they should receive energy from the grid. Alternatively or in addition, a high state of charge of the energy storage units can also be expressed by a high voltage in the DC voltage grid. This indicates to the sources that they should reduce their generated power in order to protect the grid from failure as a result of an over-supply of electrical energy.

A first upper threshold value, at which the energy storage units should receive energy, and a second upper threshold value, higher than the first, at which the energy generators should reduce their generated power (possibly to the detriment of the degree of efficiency), are also conceivable. The same applies to an under-supply of electrical energy. From a first lower threshold value, the energy generators are instructed to increase their generated power, and from a lower second threshold value the energy storage units feed electrical energy into the power distribution grid. Here, the first lower threshold value can be lower or higher than the second lower threshold value. Furthermore, a further lower threshold value can be introduced at which the electrical consumers reduce their received power.

It is possible to dispense with a higher-level control/regulation device which ensures that sufficient electrical energy is available to the consumers and protects the DC voltage grid against overloading. Each electrical component of the DC voltage grid, whether consumer, generator or storage unit, is informed about the grid voltage level by way of the state of the DC grid and can thus contribute in a targeted manner to the stability of the DC grid.

It is particularly advantageous if the operating behavior of the electrical components changes on account of the state of the DC voltage grid. The information about one or several states in the DC voltage grid can be used to activate protective devices or to optimize the operating behavior. For example, it enables energy storage units to be used in an optimum manner and/or the service life of all or at least some of the electrical components to be increased. It is also possible for example to maximize the output of units produced in a production facility.

On account of the proposed apparatus or on account of the proposed method, it is possible to achieve a reliable protection of the DC voltage grid and at the same time to increase the security of supply of the electrical components.

The application of the proposed DC voltage grid is particularly advantageous for a wind farm with a plurality of wind turbines. If the DC voltage grid via which the individual wind turbines are interconnected reaches its capacity limit, then this can be communicated through the variation of the voltage of the individual wind turbines, which then reduce their fed-in power on the basis of this information, for example by adjusting their blades (pitch adjustment). Likewise, an impending future critical grid state, based for example on wind forecasts, can already be taken into consideration as the state of the DC voltage grid and transmitted to the wind turbines by way of the DC voltage. This communication is very reliable and is suitable in particular for the protection of wind turbines, which have high requirements for the reliable transmission of data on account of their high hazard potential in the event of a fault.

The use of the DC voltage grid in a vehicle is also particularly advantageous, since secure communication can also be ensured there and secure operation of the vehicle can be implemented. The capacity utilization of the energy storage units and thus the range of the vehicle can likewise be increased, for example by adapting the operating behavior, for example its acceleration pattern.

The actuator can be embodied as a DC/DC actuator in order to convert an existing DC voltage into a variable DC voltage of the DC voltage grid. However, it is alternatively or in addition also possible to supply power to the DC voltage grid from an AC voltage grid such as a power supply grid or a DC generator. In this case, a power converter, also referred to as AC/DC actuator, is then used. It is likewise possible for provision to be made for a combination of DC/DC actuator and power converter.

In an advantageous embodiment of the invention, one of the electrical components is a protective device of the DC voltage grid. The communication via the state of the DC voltage grid is particularly suitable for a protective device, as this communication is very reliable. The state is transmitted continuously during operation and, unlike data transmissions, is also immune to interference. And in the event of a failure of the DC voltage, i.e. of the communication, no more energy is distributed in the DC voltage grid and, as a result, the electrical components enter the safe state.

Known data transmissions, particularly in the industrial environment, for example with power converters as electrical consumers, are subject to a high degree of electromagnetic interference variables. When implementing data transmissions, for example in the form of a bus system, measures must be taken to protect against this interference. Moreover, it must be possible to implement reliable operation in the event of a failure of the data line. With the proposed solution, this is already achieved in terms of design, as the supply of power to the electrical consumers is reliably interrupted in the event of a failure of the DC voltage.

The protective device can be for example a braking resistor, which converts excess energy of the DC voltage grid into heat. The actuation, also activation, of the braking resistor can take place particularly easily and thus reliably by means of a comparator, which compares the DC voltage in the DC voltage grid with a threshold value. If the threshold value is exceeded or fallen below, the protective device, for example the braking chopper, can be activated.

In a further advantageous embodiment of the invention, the protective device is arranged at a distance of more than 10 m, in particular at a distance of more than 100 m, from the remaining electrical components. On account of the communication via the supply voltage, the communication can also take place reliably over long distances. In particular, the protective device can be arranged outside a building, for example to improve the cooling. For example, a braking resistor can be arranged in a liquid cooling medium so as to ensure good heat dissipation into the environment. The ease of actuation, for example by means of a comparator as described above, is also enabled specifically by the arrangement in a liquid cooling medium.

In a further advantageous embodiment of the invention, the electrical components comprise an energy storage unit and an electrical consumer. Particularly in the event of interaction between the energy storage unit and the consumer, and where appropriate also energy sources, it can be advantageous to exchange information about the energy content of the energy storage unit in order to optimize the operating behavior and prevent the energy storage unit from becoming fully discharged.

In a further advantageous embodiment of the invention, the DC voltage is raised as the state of charge of the energy storage unit increases. The state of charge of an energy storage unit is often referred to as SoC. The state of charge can be used to determine an average state of charge of all energy storage units present in the DC voltage grid. Here, this average value can also be weighted with the quantity of energy that can be stored by the corresponding energy storage unit. The higher this value is, the higher the DC voltage in the grid is controlled or regulated. The high DC voltage indicates the high power capacity of the DC voltage grid to the electrical consumers.

In a further advantageous embodiment of the invention, the DC voltage is raised as the capacity utilization of the energy sources decreases. The lower the capacity utilization of the energy sources, the greater the capacity to supply power to the DC voltage grid. The capacity utilization of the energy source is understood to mean the ratio of fed-in power to the maximum power that can be fed in from the corresponding energy source. Therefore, if the capacity utilization of the energy sources is low, the amount of the voltage is incremented.

In a further advantageous embodiment of the invention, some of the energy sources of the DC voltage grid are deactivated when a first threshold value is exceeded. This is a measure which enables the information about the state of the DC voltage grid to be used advantageously for the operation of the DC voltage grid. If the capacity to supply electrical power is so great that this exceeds a first threshold value, individual energy sources can be deactivated. This is for example also possible when the energy storage units reach a high state of charge, for example above 80%. The deactivation of energy sources results in the DC voltage grid being operated cost-effectively, as a higher degree of efficiency is often associated with a higher capacity utilization of the energy sources.

In a further advantageous embodiment of the invention, at least some of the energy storage units are discharged when a second threshold value is fallen below. If the DC voltage is low and falls below a second threshold value, this suggests that the power available from the energy sources is insufficient to cover the demand of the electrical consumers. In this case, it is advantageous to discharge the energy storage units and thus make additional energy available to the electrical consumers in the DC voltage grid. This also has a stabilizing effect on the interaction between energy sources and electrical consumers.

In a further advantageous embodiment of the invention, some of the electrical consumers are operated with reduced power or deactivated when a third threshold value is fallen below. If the power supplied falls behind the demand of the consumers even though the energy sources are being operated with a high capacity utilization of for example more than 90% or even 100%, then it is advantageous for the electrical consumers to detect this state on the basis of the amount of the DC voltage and reduce their power. If this is insufficient, they can also be deactivated, for example if a further threshold value is fallen below.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
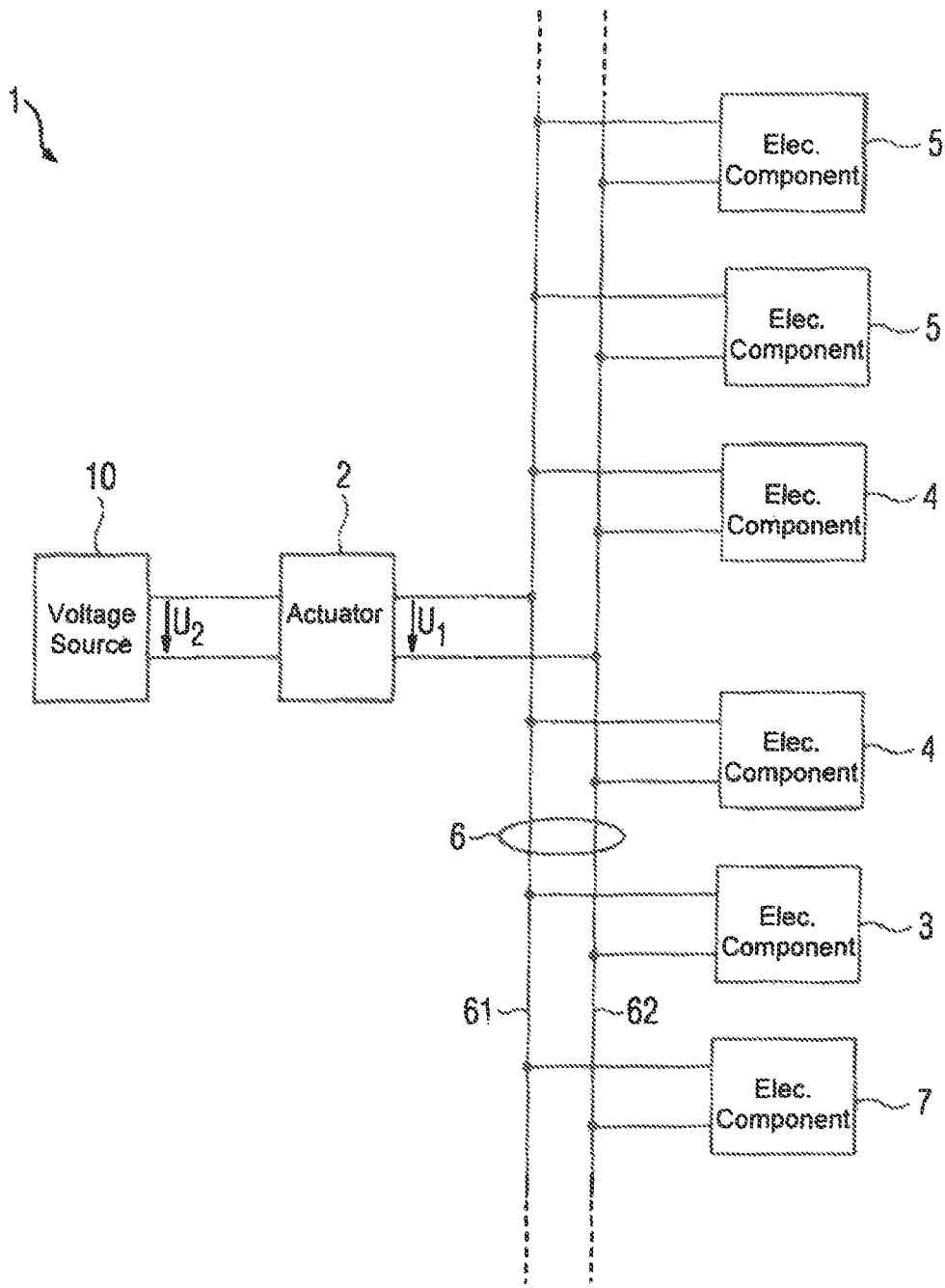
FIG. 1 shows a DC voltage grid.

FIG. 1 shows an exemplary embodiment of a DC voltage grid 1. This has one or several energy sources 3, and electrical consumers 5. In addition, the DC voltage grid 1 can also have energy storage units 4 and a protective device 7. The DC voltage $U_1$ of the DC voltage grid 1 is variable and is present between the two parts 61, 62 of the conductor 6, which interconnects the individual electrical components 3, 4, 5, 7. This DC voltage $U_1$ can be adjusted, in other words varied, by the actuator 2 in order to describe the state of the DC voltage grid 1. The actuator 2 is fed from a voltage source 10 with a voltage $U_2$. The voltage source is an energy source which specifies the DC voltage $U_1$ in the DC voltage grid 1 via the actuator 2. This voltage source 10 can be formed for example by a power supply network from which energy is drawn to feed the electrical consumers 5 or into which energy from wind turbines is fed. It can also be a generator of a vehicle.

Figure 2:
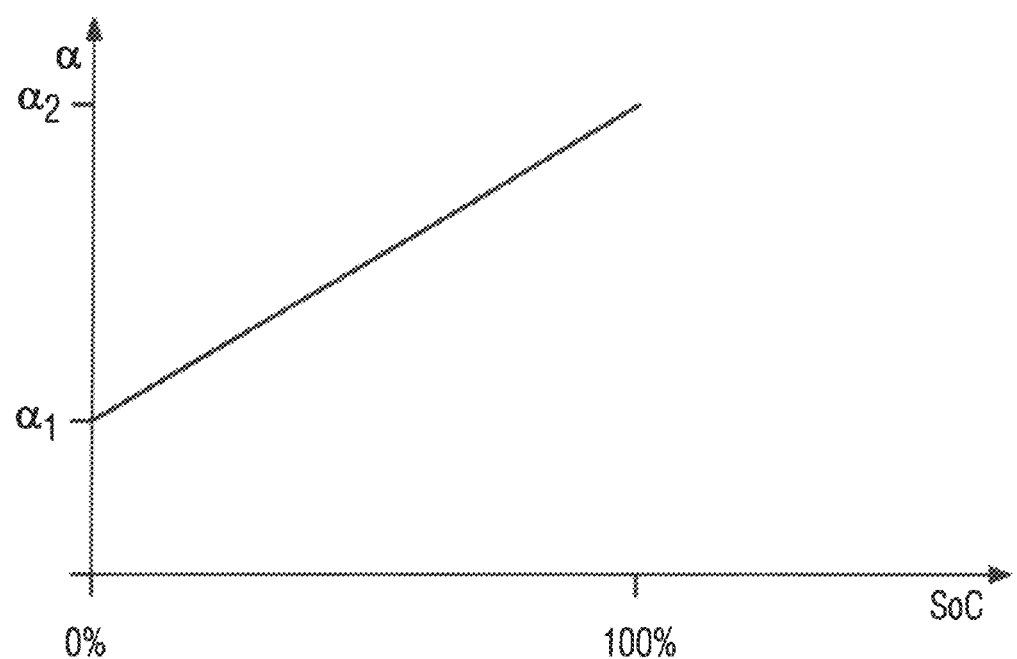
FIG. 2 shows the relationship between the state of charge of the energy storage unit and a first voltage adjustment factor.

FIG. 2 shows a diagram for the adjustment of the DC voltage $U_1$ as a function of the state of charge SoC of the energy storage unit 4. The fuller the energy storage unit 4, the higher the first voltage increase factor α. The DC voltage $U_1$ is calculated by multiplying the voltage $U_2$ of the voltage source 10 by the first voltage adjustment factor α as follows:

$$U_1 = U_2 \cdot \alpha.$$

Here, the relationship between the state of charge SoC and the first voltage adjustment factor α can be linear, but can also be formed by any other monotonic function.

Figure 3:
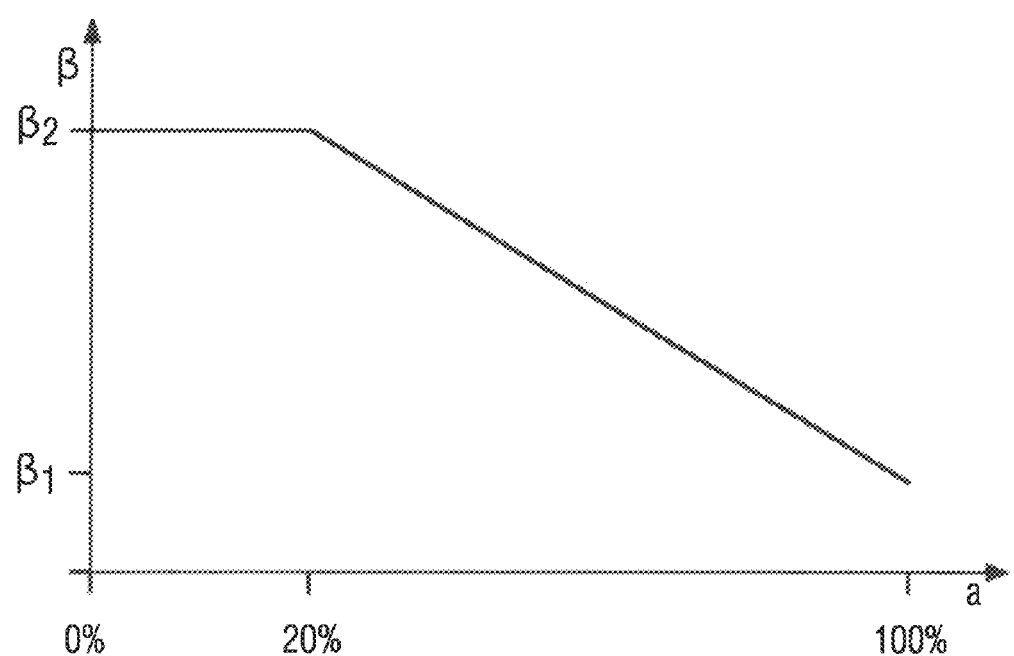
FIG. 3 shows the relationship between the capacity utilization of the energy sources and a second voltage adjustment factor.

FIG. 3 shows a diagram for the adjustment of the DC voltage $U_1$ as a function of the capacity utilization a of the energy sources 3. The lower the capacity utilization of the energy sources, the higher the second voltage increase factor β. The DC voltage $U_1$ is calculated by multiplying the voltage $U_2$ of the voltage source 10 by the second voltage adjustment factor β as follows:

$$U_1 = U_2 \cdot \beta.$$

Here, the relationship between the capacity utilization a and the second voltage adjustment factor β can be linear, but can also be formed by any other monotonic function. It can be advantageous here if the second voltage adjustment factor β is constant over a certain range of the capacity utilization a.

If both a first and a second voltage adjustment factor is used by including the state of charge SoC and the capacity utilization a, then the DC voltage $U_1$ is calculated by multiplying the voltage $U_2$ of the voltage source 10 by the first voltage adjustment factor α and the second voltage adjustment factor β as follows:

$$U_1 = U_2 \cdot \alpha \cdot \beta.$$

The individual values $\alpha_1, \alpha_2, \beta_1, \beta_2$ of the first and second voltage adjustment factor result from the configuration of the DC voltage grid 1. It is necessary to consider here that the values $\alpha_1, \alpha_2, \beta_1, \beta_2$ do not cause an overloading of the DC voltage grid 1 in terms of voltage or current.

In summary, the invention relates to a DC voltage grid, wherein the DC voltage grid is able to be operated with a DC voltage. To improve the DC voltage grid, it is proposed for the DC voltage grid to have an actuator by way of which the DC voltage of the DC voltage grid is able to be varied, wherein the amount of the DC voltage depends on the state of the energy sources and/or of the energy storage units and/or the electrical consumers. The invention furthermore relates to a method for operating such a DC voltage grid, wherein the DC voltage of the DC voltage grid is controlled or regulated as a function of the state of the energy sources and/or of the energy storage units and/or of the electrical consumers.

In other words, the invention relates to a DC voltage grid having electrical components which are interconnected electrically by means of a conductor, wherein the DC voltage grid is able to be operated with a DC voltage between parts of the conductor. To improve the DC voltage grid, it is proposed for the DC voltage grid to have an actuator by way of which the DC voltage of the DC voltage grid is able to be varied such that the value of the DC voltage depends on at least one state of the DC voltage grid and information about the state is transmitted to the electrical components of the DC voltage grid by way of the DC voltage. The invention furthermore relates to a wind farm having such a DC voltage grid with wind turbines. The invention furthermore relates to a method for operating such a DC voltage grid or such a wind farm, wherein the DC voltage of the DC voltage grid is controlled or regulated as a function of a state of the DC voltage grid.

The invention claimed is:

1. A DC voltage grid, comprising:
   an electrical conductor electrically interconnecting electrical components connected to the DC voltage grid, the electrical components comprising at least a consumer, an energy storage unit, and an energy source, and the electrical conductor having a variable DC grid voltage applied between parts of the electrical conductor;
   an actuator receiving voltage from a voltage source that specifies the variable DC grid voltage via the actuator and supplying the electrical conductor with the variable DC grid voltage, wherein the actuator is configured to control and vary the DC grid voltage in order to describe a state of the DC voltage grid, wherein information about the state of the DC voltage grid is continuously transmitted during operation of the DC voltage grid to the electrical components connected to the DC voltage grid by the controlled and variable DC grid voltage, and wherein the DC grid voltage is adjusted by the actuator by either one or both of a first adjustment factor as a function of a state of charge of the energy storage unit or of a second adjustment factor as a function of a capacity utilization of the energy source; and
   wherein the adjusted DC grid voltage is calculated by multiplying the voltage from voltage source that specifies the variable DC grid voltage by either one or both of the first adjustment factor or of the second adjustment factor.

2. The DC voltage grid of claim 1, wherein one of the electrical components is a protective device of the DC voltage grid.

3. The DC voltage grid of claim 2, wherein the protective device is arranged at a distance of more than 10 m from others of the interconnected electrical components.

4. The DC voltage grid of claim 2, wherein the protective device is arranged at a distance of more than 100 m from others of the interconnected electrical components.

5. The DC voltage grid of claim 1, wherein at least some of the electrical components comprise energy sources in form of wind turbines configured for blade adjustment as a function of a value of the DC grid voltage.

6. A wind farm comprising a DC voltage grid with an electrical conductor electrically interconnecting wind turbines and electrical components connected to the DC voltage grid, the electrical components comprising at least a consumer, an energy storage unit, and an energy source, and the electrical conductor having parts between which a variable DC grid voltage is applied, and with an actuator receiving electrical power from a voltage source that specifies the variable DC grid voltage via the actuator and supplying the electrical conductor with the variable DC grid voltage to the DC voltage grid, wherein the actuator is configured to control and vary the DC grid voltage in order to describe a state of the DC voltage grid and information about the state of the DC voltage grid is continuously transmitted during operation of the DC voltage grid to the electrical components connected to the DC voltage grid by the controlled and variable DC grid voltage, and wherein the DC grid voltage is adjusted by the actuator by either one or both of a first adjustment factor as a function of a state of charge of the energy storage unit or of a second adjustment factor as a function of a capacity utilization of the energy source; and
wherein the adjusted DC grid voltage is calculated by multiplying the voltage from voltage source that specifies the variable DC grid voltage by either one or both of the first adjustment factor or of the second adjustment factor.

7. A method for operating a DC voltage grid or a wind farm connected to a DC voltage grid, wherein the DC voltage grid has an electrical conductor electrically interconnecting electrical components connected to the DC voltage grid, the electrical components comprising at least a consumer, an energy storage unit, and an energy source, the method comprising:
supplying a variable DC grid voltage between parts of the electrical conductor with an actuator receiving voltage from a voltage source that specifies the variable DC grid voltage via the actuator;
controlling and varying the DC grid voltage with the actuator in order to describe a state of the DC voltage grid;
adjusting the DC grid voltage by the actuator by either one or both of a first adjustment factor as a function of a state of charge of the energy storage unit or of a second adjustment factor as a function of a capacity utilization of the energy source;
continuously transmitting information about the state of the DC voltage grid during operation of the DC voltage grid to the electrical components connected to the DC voltage grid by the controlled and variable DC grid voltage; and
wherein the adjusted DC grid voltage is calculated by multiplying the voltage from voltage source that specifies the variable DC grid voltage by either one or both of the first adjustment factor or of the second adjustment factor.

8. The method of claim 7, further comprising changing an operating behavior of at least some of the electrical components as a function of a value of the DC grid voltage.

9. The method of claim 7, further comprising
increasing a DC voltage of the energy storage unit as the state of charge of the energy storage unit increases.

10. The method of claim 7, further comprising
increasing a DC voltage of the energy source as the capacity utilization of the energy source decreases.

11. The method of claim 10, wherein the energy source is a wind turbine.

12. The method of claim 7, wherein several of the interconnected electrical components comprise energy sources and at least a portion of the energy sources are deactivated when a first threshold value of the DC grid voltage is exceeded.

13. The method of claim 7, wherein several of the interconnected electrical components comprise energy storage units and at least a portion of the energy storage units are discharged when the DC grid voltage is below a second threshold value.

14. The method of claim 7, wherein several of the interconnected electrical components comprise electrical consumers and at least a portion of the electrical consumers are operated with reduced power or deactivated when a third threshold value of the DC grid voltage is undershot.

15. The method of claim 7, wherein one of the electrical components is a protective device of the DC voltage grid, the method further comprising activating the protective device when a safety threshold value of the DC grid voltage is exceeded or undershot.

16. The method of claim 11, further comprising adjusting blades of the wind turbine as a function of the value of the DC grid voltage.

* * * * *